United States Patent [19]

Wang et al.

[11] Patent Number: 5,069,783

[45] Date of Patent: Dec. 3, 1991

[54] LIQUID TREATMENT APPARATUS

[75] Inventors: Lawrence K. Wang; Mu H. S. Wang, both of Latham; Chong S. Hwang, Flushing; Harold Rhow, Hartsdale, all of N.Y.

[73] Assignees: Int'l Environmental Systems, Inc., Pittsfield, Mass.; Globe Environmental Protection, Inc., Flushing, N.Y.

[21] Appl. No.: 523,891

[22] Filed: May 16, 1990

[51] Int. Cl.$^5$ ............................................ C02F 1/28
[52] U.S. Cl. ................................. 210/196; 210/197; 210/202; 210/207; 210/221.2; 210/260; 210/266; 210/275
[58] Field of Search ............................ 210/703–705, 210/96.1, 195.1, 196, 197, 202, 203, 205, 220, 221.1, 221.2, 260, 262, 275, 266, 525, 530, 207

[56] References Cited

U.S. PATENT DOCUMENTS

| | | | |
|---|---|---|---|
| 3,171,804 | 3/1965 | Rice | 210/724 |
| 3,307,701 | 3/1967 | Krofta | 210/195.1 |
| 3,403,096 | 9/1968 | Mackrle et al. | 210/202 |
| 3,408,288 | 10/1968 | Messa | 210/202 |
| 3,429,442 | 2/1969 | Mackrle et al. | 210/202 |
| 3,820,659 | 6/1974 | Parlette | 210/195 |
| 4,022,696 | 5/1977 | Krofta | 210/520 |
| 4,151,093 | 4/1979 | Krofta | 210/386 |
| 4,157,952 | 6/1979 | Krofta | 209/170 |
| 4,184,967 | 1/1980 | Krofta | 210/525 |
| 4,303,517 | 12/1981 | Love et al. | 210/208 |
| 4,303,518 | 12/1981 | Grosshandler | 210/236 |
| 4,377,485 | 3/1983 | Krofta | 210/704 |
| 4,626,345 | 12/1986 | Krofta | 210/104 |
| 4,626,346 | 12/1986 | Hall | 210/110 |
| 4,673,494 | 7/1987 | Krofta | 210/202 |
| 4,673,498 | 6/1987 | Swinney et al. | 210/275 |
| 4,673,500 | 6/1987 | Hoofnagle et al. | 210/307 |
| 4,931,175 | 6/1990 | Krofta | 210/86 |

OTHER PUBLICATIONS

The U.S. Dept. of Commerce, National Technical Information Service (NTIS) Report #PB 89-158,398 (1988).

L. K. Wang and W. J. Mahoney, Part A: Wastewater Treatment Proceedings of Purdue Industrial Waste Conference, May 1989.

L. K. Wang, M. H. S. Wang and W. J. Mahoney, Part B: Waste Sludge Management, Proceedings of Purdue Industrial Waste Conference, May 1989.

*Primary Examiner*—Peter Hruskoci
*Attorney, Agent, or Firm*—Birch, Stewart, Kolasch & Birch

[57] ABSTRACT

A liquid treatment multi-stage process and apparatus thereof for removing dissolved, colloidal, volatile, suspended and living contaminants from water, wastewater or sludge streams which includes chemical feeding, static mixing, gas pressurization, hydraulic flocculation, sedimentation, flotation, adsorption, filtration and disinfection by converting dissolved solids to insoluble forms by oxidation and chemical precipitation, coagulating and clarifying colloidal substances and microorganisms, adsorbing, filtering and disinfecting the remaining contaminants in the liquid to produce a purified liquid. A majority of insoluble suspended particles in the liquid are collected by sedimentation and flotation separation procedures and subsequently dewatered and dried and all necessary unit processes operations are incorporated into an apparatus with common walls and drive mechanisms for improving the liquid treatment efficiency, reducing secondary pollution caused by scums/sludges, and eliminating the needs of a separate mixer, flocculator, pressure vessel, aerator, adsorber, filter, clear well and chlorinator.

6 Claims, 2 Drawing Sheets

LIQUID TREATMENT APPARATUS

BACKGROUND OF THE INVENTION

1. Field of the Invention

The present invention relates to a liquid treatment process and an apparatus thereof and more particularly, to a multistage process and a package apparatus thereof for removal of dissolved, colloidal, suspended, volatile, and living contaminants from liquid.

2. Description of the Prior Art

Various types of liquid treatment processes are well known in the art. In such processes, the suspended contaminants in liquid are commonly removed by a sedimentation separation procedure wherein the particles in suspension have a specific gravity greater than that of the liquid in which they are suspended. When the specific gravity of the suspended contaminants is similar to that of the liquid, then a dissolved air flotation separation procedure is more effective and is employed. Many types of prior art processes have been developed for the separation of suspended particulates from a liquid.

It has been a standard practice for engineers to construct separate liquid treatment units to remove dissolved, colloidal, suspended, volatile and living contaminants, and to construct separate aeration units for oxidation, air dissolving and distribution. For example, for soluble iron and manganese removal in a conventional liquid treatment system, an aerator or an oxidizer is required to convert a soluble form to an insoluble form by oxidation.

Both such conventional sedimentation systems and flotation systems involve the use of separate mixers, flocculators, adsorbers, and chlorinators.

Particularly, such conventional flotation systems require separate pressure vessels for dissolving air and for air bubble generation. Therefore, the capital costs and land space requirements of such conventional systems are high. Furthermore, secondary pollution caused by the disposal of scum and sludge in liquid streams is a common problem.

Such conventional liquid treatment processes and apparatuses thereof are described in the U.S. Pat. No. 3,171,804 to Rice, U.S. Pat. No. 3,307,701 to Krofta, U.S. Pat. No. 3,820,659 to Parlette, U.S. Pat. No. 4,022,696 to Krofta, U.S. Pat. No. 4,151,093 to Krofta, U.S. Pat. No. 4,157,952 to Krofta, U.S. Pat. No. 4,184,967 to Krofta, U.S. Pat. No. 4,303,517 to Love et al, U.S. Pat. No. 4,377,485 to Krofta, U.S. Pat. No. 4,626,345 to Krofta, U.S. Pat. No. 4,626,346 to Hall, U.S. Pat. No. 4,673,494 to Krofta, U.S. Pat. No. 4,673,498 to Swinney et al, U.S. Pat. No. 4,673,500 to Hoofnagle et al and L.K. Wang, using Air Flotation and Filtration in Color and Giardia removal. U.S. Department of Commerce, National Technical Information Service, Springfield, Virginia, USA. Technical Report No. PB89-158398/AS. October 1988. L.K. Wang and W.J. Mohoney. Treatment of Storm Run-off by Oil-Water Separation, Flotation, Filtration and Adsorption, Part A: Wastewater Treatment Proceedings of the 44th Industrial Waste Conference, P. 655-666, May 1989. L.K. Wang, M.H.S. Wang and W.J. Mahoney. Treatment of Storm Run-off by Oil-Water Separation, Flotation, Filtration and Adsorption: Part B: Waste Sludge, Management. Proceedings of the 44th Industiral Waste Conference, P. 667-673, May 1989.

SUMMARY OF THE INVENTION

Accordingly, it is an object of the present invention to provide an improved liquid treatment apparatus thereof.

Another object of the present invention is to provide a combined process system and apparatus having a number of unique design features for improving liquid treatment efficiency and cost saving, and for reducing secondary pollutants.

A further object of the present invention is to provide a combined liquid treating multistage apparatus for eliminating the need of many separate treatment units or devices in comparable conventional liquid treatment processes such as a (a) mechanical mixer, (b) mechanical flocculator, (c) sedimentation clarifier, (d) filter house, (e) volatile organic compound adsorber, (f) chlorination station, (g) clear well basement, (h) elevated tower for filter backwash, (i) outside pressure retention tank for gas dissolving, (j) high head provision for effective backwash, (k) special aeration tower for iron and manganese removal, (l) additional clarifier for hardness removal, (m) flow meters for recycle flow determination, and (n) neutralization unit for corrosion control. While the aforementioned conventional treatment units or devices may be eliminated for cost saving, one or more of them may be adopted to the present invention as a standby when desired or when the duplicate units are required by the monitoring agencies.

Still another object of the present invention is to provide a liquid treatment apparatus having a pressurized liquid flow in a pressure vessel such as a gas dissolving tube which is inside of the apparatus and generates gas bubbles depending on the contaminants to be removed so as to treat potable water, wastewater, and liquid sludge, remove suspended particulates, and dissolved, colloidal, living and volatile contaminants. The built-in pressure vessel within the apparatus is for more efficient operation and cost saving.

Yet another object of the present invention is to provide a liquid treatment apparatus for directing pressurized liquid to a flotation chamber being maintained under pressure until the moment of its release in the flotation chamber without long distance complication since this is accomplished by a built-in pressure vessel, and special pressure relief pipes in the flotation chamber (i.e. outer tank between the inner rail and the baffle) rather than in the conduit leading to that flotation chamber (as in the case of conventional circular flotation apparatus), which ensures that the gas bubbles released in the flotation chamber will be as small as possible, thereby improving aeration and flotation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a liquid treatment multi-stage process and apparatus therefore for removing dissolved, colloidal, volatile, suspended and living contaminants from water, wastewater or sludge streams which includes chemical feeding, static mixing, built-in gas pressurization, hydraulic flocculation, sedimentation, flotation, adsorption, filtration and dry-chlorine disinfection by converting dissolved solids to insoluble forms by oxidation and chemical precipitation, coagulating and separating colloidal substances and microorganisms, adsorbing, filtering and disinfecting the remaining contaminants in liquid to produce a purified liquid. That is, a majority of original and newly formed insoluble suspended particles and liquid is collected by sedimentation separation and flotation separation and subsequently treated to remove water and dried and all necessary unit process operations are incorporated into an apparatus with common walls and drive mechanisms for improving the liquid treatment efficiency, reducing secondary pollutions caused by scums and sludges, and thereby eliminating the needs of various separate components including a mixer, flocculator, pressure vessel, aerator, adsorber, filter, clear well and chlorinator.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
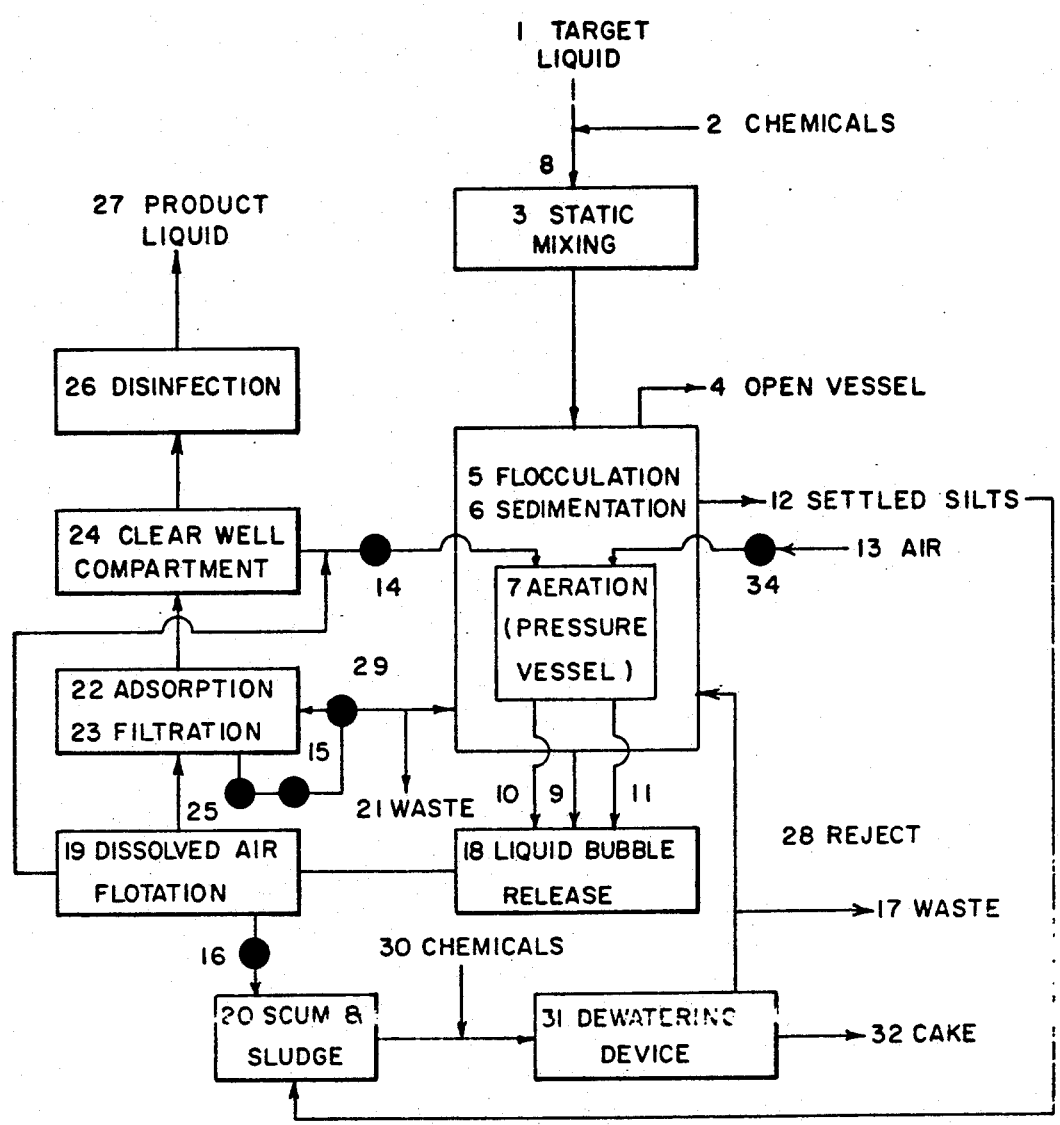
FIG. 1 shows the overall process according to the present invention.
Figure 2:
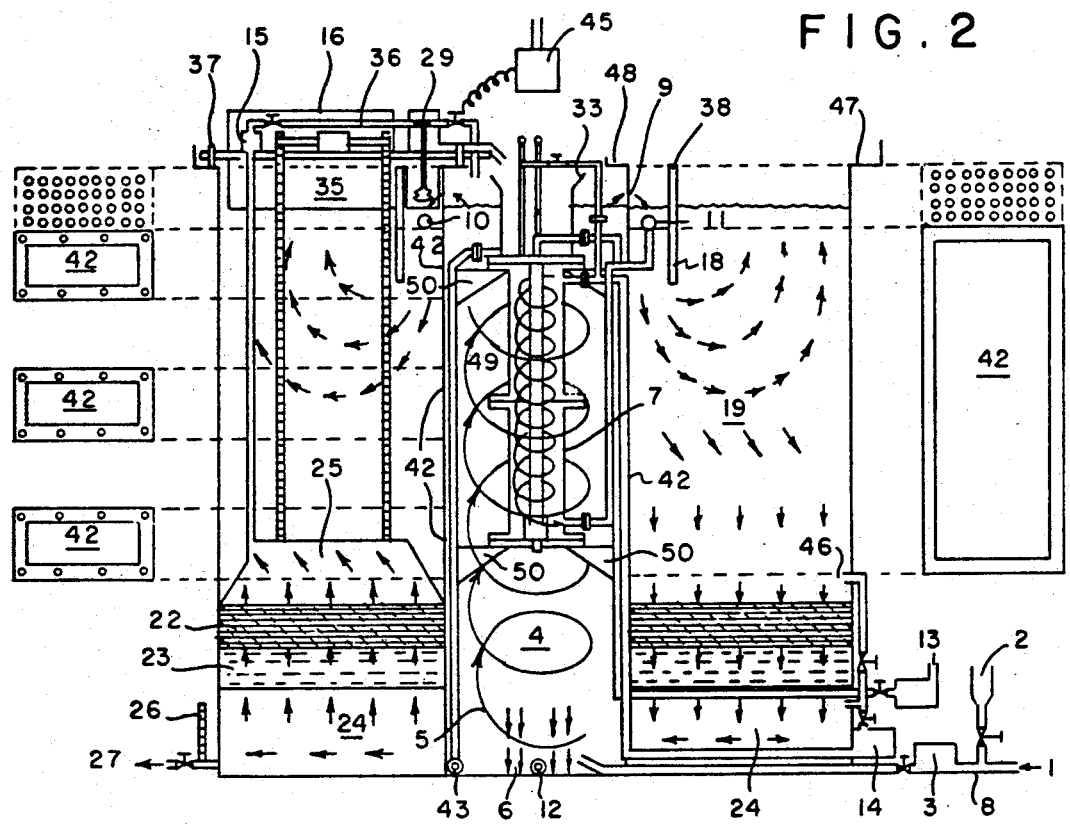
FIG. 2 is sectional view of the apparatus according to the present invention.
Figure 3:
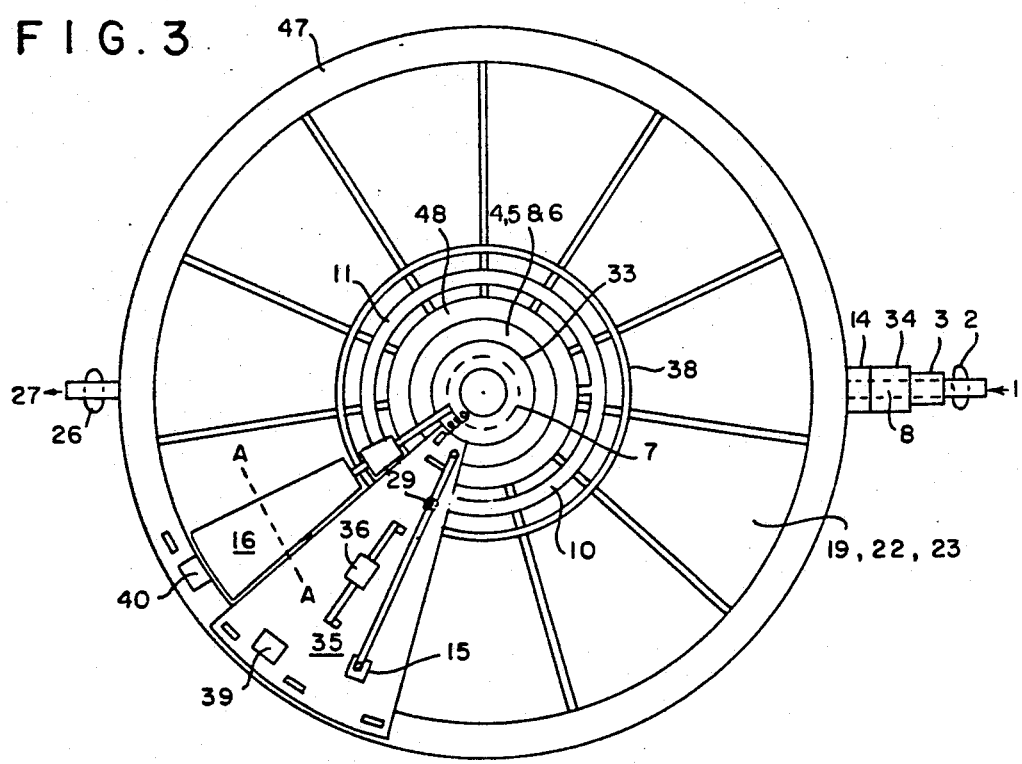
FIG. 3 is a top plan view according to the apparatus of the present invention.

Referring now in detail to the drawings for the purpose of illustrating preferred embodiments of the present invention, the liquid treatment process and the apparatus thereof are shown in the process steps of FIGS. 1, 2, and 3, which includes the steps of chemical feeding, static mixing, flocculating, sedimentating, dissolving gas in a dissolving tube, liquid-bubble releasing, floating, automatic backwashed adsorbing and filtrating, backwashing, dry chlorine disinfecting, and sludge dewatering, for removal of dissolved, suspended, colloidal, volatile and living contaminants from a liquid stream. As shown in FIG. 1, the target liquid 1 can be water, waste water or a liquid sludge stream such as river water, lake water, reservoir water, ground water, sea water, sewage, industrial water, industrial effluent, liquid sludge, or combinations thereof. First chemicals 2 can be added to the target liquid 1 when necessary. The liquid-chemical mixture is pumped through an inlet pipe 8 to a static mixing member 3, and then to a cylindrical open vessel 4 at a tangential direction where flocculation 5 and sedimentation 6 occur simultaneously. The static mixing 3 is for improved chemical mixing.

Gas 13 is compressed by a gas compressor 34 and added in varied amounts to a cylindrical pressure vessel 7 which is inside of the open vessel 4. The gas 13 is selected from the group consisting of gaseous air, oxygen carbon dioxide and combination thereof. The settled silts 12 at the bottom of the open vessel 4 are discharged periodically to a scum and sludge collector 20. A measuring member can be provided on the apparatus for measuring the flow rates of liquid and various gases in the inlet pipe 8, the open vessel 4, and the pressure vessel 7, respectively. The liquid from a clear well compartment 24 or a flotation clarified water 46 is pumped into the pressure vessel 7 by a pressure pump 14 at the same time when the gas 13 is pumped by the gas compressor 34 to the same pressure vessel 7 for dissolving the gas 13 into the liquid under pressure. An effluent of the pressure vessel 7 containing super-saturated gas passes through unique liquid-bubble release rings 10 and 11 in the outer tank between an inner rail 48 and a baffle 38, and enters a liquid bubble release zone 18 where it meets the effluent 9 of the open vessel 4. The mixture of the open vessel effluent 9 and the pressure vessel effluent from the rings 10 and 11 flow to a dissolved gas flotation chamber 19 from where the flotation effluent flows downward to pass through an adsorption bed 22, a sand filtration bed 23 and reaches a clear well compartment 24. The floated scum in the collector 20 is collected by a sludge scoop 16. Part of the effluent from the clear well in the compartment 24 is recycled by a pressure pump 14 to the pressure vessel 7 with gas injection from the gas compressor 34.

The remaining effluent of the clear well in the compartment 24 is disinfected by a unique solid chlorination 26 before being discharged as a product liquid 27. Alternatively, a flotation clarified water 46 from the dissolved gas flotation 19 can be recycled by the pressure pump 14 to the pressure vessel 7 for bubble generation. The scum and sludge in the collector 20 is conditioned by second chemicals 30, dewatered by a dewatering device 31, and discharged as a sludge cake 32. A reject 28 from a dewatering member 31 is either recycled to the open vessel 4 for reprocessing or disposed as wastewater 17. Periodically the adsorption bed 22 and the sand filtration bed 23 must be backwashed.

The adsorption and filtration employ granular activated carbons, activated alumina, silica sands, ion exchange resins, manganese oxide, greensands, polymeric resins, gravels, coals, metal filter medium, plastic filter medium, and combinations thereof. The backwash wastewater which is collected by a backwash hood 25, sucked by a backwash pump 15 can also be recycled to the open vessel 4 for reprocessing, or simply be discharged as waste 21. The carbon and sand particles recovered by the separator 29 are returned to the adsorption bed 22 and the sand filtration bed 23.

As shown in FIGS. 2 and 3, a baffle ring 38 between the liquid-bubble release zone 18 and the flotation chamber 19 may be about 1 to 2 feet below the water surface. A moving carriage 35 has a platform on which are mounted the backwash pump 15, the separator 29, a motor and gearing member 36 for the backwash hoop, a first driving motor 39 for the entire moving carriage 35, the sludge scoop 16, and a second driving motor 40 for the sludge scoop 16. The rotation direction of the moving carriage 35 can be either clockwise or counterclockwise. The rotation speeds of both the moving carriage 35 and the sludge scoop 16 are adjustable. There are rollers 37 carrying the weight of the entire moving carriage 35 and rolling on an outer rail 47 and an inner rail 48. While there is only one flotation chamber 19 above the adsorption bed 22 and the filtration bed 23, the beds 22 and 23 of the adsorption and filtration are divided into many "pie" shaped sections and each combined adsorption and filtration section can be individually backwashed as shown in FIG. 3. The horizontal section of the backwash hood 25 is identical to a combined adsorption and filtration section as far as the shape and dimensions are concerned. The backwash hood 25 can move up and down with the motor and gearing member 36 and travel horizontally with the first driving motor 39. When a combined adsorption and filtration section is ready to be backwashed, the backwash hood 25 travels to the top of that particular section, stops, moves down to seal the adsorption and filtration section, and starts to backwash with the pump 15 for a specified time period. After the adsorption and filtration beds 22 and 23 are thoroughly backwashed and cleaned, the backwash pump 15 stops, the backwash hood 25 moves up, and travels to another adsorption and filtration section.

At the top and center of present inventions apparatus, there is an universal joint 45 for delivering power source to the entire apparatus. Immediately below the universal joint 45, there is a sludge collecting member 33 for receiving and discharging the wet sludge from the sludge scoop 16 to a lower location 43. At the center but below the sludge collecting member 33, there is the pressure vessel 7 as the air dissolving tube. The center of the pressure vessel 7 is a plastic porous tube 49 for uniform distribution of compressed air into water throughout the entire pressure vessel 7. The pressure vessel 7 is supported by stainless steel angles 50, bolted at the center of the open vessel 4. Sufficient numbers of service windows 42 which are bolted along the outer wall of the open vessel 4 making the pressure vessel 7 accessible for service when necessary.

According to the present invention, in the process of the present invention, contaminants such as iron, manganese, and other reducing substances are oxidized by air and oxygen gases. Calcium and magnesium hardness are precipitated. Colloidal substances are coagulated and destabilized. All original and newly formed insoluble particle in liquid are collected by the sedimentation separation in the open vessel and by flotation separation in the flotation chamber at atmospheric pressure. The purified liquid passes through the multi-media filtration bed consisting of granular activated carbon and/or sand for final treatment before disinfection by the dry solid chlorinator. The settled sludge and the floated scum are collected from the flocculation tank bottom by gravity and from the flotation water surface by the sludge scoop 16, respectively. Both the scums and the sludges 20 are chemically conditioned by chemicals 30, dewatered by dewatering device 31, and dried as a cake 32 for final disposal. The carbon beds and filter beds are periodically backwashed, and their backwash wastewater is processed by the separator 29 before recycle to the open vessel 4 for reprocessing. The filter media from the separator 29 are returned to the beds for adsorption 22 and filtration 23 the separator 29 separates granular activated carbon and/or sand from the backwash wastewater.

For the invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for treating liquid, comprising in combination:

an inlet pipe with an in-line static mixing member;
    a cylindrical outer tank having the bottom thereof as an outside wall of said apparatus;
    a cylindrical inner open vessel disposed within said outer tank for flocculation and sedimentation;
    means for introducing liquid to be flocculated from said inlet pipe into the bottom of said open vessel in a tangential direction so as to create a swirling action for flocculation;
    means for removing settled, heavy silts, and sludges from the bottom of said open vessel;
    means for removing clarified effluent from said open vessel and for introducing said clarified effluent into said cylindrical outer tank;
    a cylindrical inner pressure vessel disposed within said open vessel for gas dissolution under pressure;
    means for tangentially introducing liquid into said pressure vessel;
    means for introducing at least one gas to be uniformly distributed and pressurized into said pressure vessel in which liquid flows in a tangential direction so as to create a swirling flow pattern for dissolving into said liquid gas;
    means for measuring the flow rates of liquid and various gases in said inlet pipe, open vessel, and pressure vessel;
    releasing means for introducing liquid containing dissolved gas to be depresssurized clarified from said pressure vessel into said outer tank for mixture with said clarified effluent for bubble generation and flotation purification;
    sludge scooping and scraping means for removing scum and floated sludge from said outer tank;
    sludge discharge means for transporting said scum and floated sludge through a sludge collection member to a dewatering device;
    an adsorption and filtration bed near the bottom of said outer tank for downward purification of flotation clarified liquid;
    a clear well compartment over the bottom of said outer tank for collection of adsorption and filtration purified liquid;
    an outlet for discharging said adsorption and filtration purified liquid from said clear well;
    backwashing means for periodically cleaning of said adsorption and filtration bed;
    a moving carriage having a platform supported between the upper portion of the wall of said outer tank and the upper portion of the wall of said open vessel so as to hold said releasing means, sludge scooping and scraping means, backwashing means, a separator, and driving motors;
    means for circular moving said moving carriage together with said releasing means, sludge scooping, and scraping means, backwash means, separator, and driving motors along outer and inner rails on said apparatus and around the vertical axis of said apparatus;
    means for disinfecting liquid from said clear well using dry-chlorine;
    means for feeding chemicals to said scum and floated sludge;
    means for dewatering the liquid from said scum and floated sludge;
    means for recycling a portion of waste liquid from said backwashing means to said open vessel to form said liquid to be depressurized and clarified; and
    means for recycling a portion of liquid from said clear well or said flotation clarification effluent into said pressure vessel.

2. The apparatus of claim 1, wherein the pressure vessel is constructed and arranged to operate in conjunction with another pressure vessel outside said apparatus.

3. The apparatus of claim 1, wherein the dewatering means is a lagoon, gravity thickener, vacuum filtration, belt filter, dissolved air flotation thickener, centrifugation thickener, evaporator, drying bed, or combination thereof.

4. The apparatus of claim 1, wherein the backwashing means includes a traveling backwash hood, a backwash pump, and a separator and pipes.

5. The apparatus of claim 1, wherein said adsorption and filtration bed uses the media selected from the group consisting of silica sands, granular activated carbons, activated alumina, ion exchange resins, manganese oxide, greensands, polymeric resins, gravels, coals, metal filter medium and combinations thereof.

6. The apparatus of claim 1, wherein the dry chlorine is dry chlorine tablets for disinfection.

* * * * *